United States Patent [19]

Matheson et al.

[11] Patent Number: 5,178,261
[45] Date of Patent: Jan. 12, 1993

[54] CONVEYOR SYSTEM

[75] Inventors: Ronald R. Matheson, Utica; Daniel E. Hucul, New Baltimore; James F. Burkhardt, Farmington Hills; Joseph W. Schepke, Shelby Township, Macomb County, all of Mich.

[73] Assignee: Auto/Con Corporation, Mt. Clemens, Mich.

[21] Appl. No.: 707,170
[22] Filed: May 30, 1991
[51] Int. Cl.$^5$ .............................................. B65G 17/00
[52] U.S. Cl. ................................. 198/803.2; 198/465.3
[58] Field of Search ................... 198/465.1, 465.3, 795, 198/803.01, 803.2

[56] References Cited

U.S. PATENT DOCUMENTS

| | | |
|---|---|---|
| Re. 25,886 | 10/1965 | Cargill . |
| 1,282,379 | 10/1918 | Christensen . |
| 1,812,112 | 6/1931 | Morgan . |
| 1,851,380 | 3/1932 | Briggs . |
| 2,275,244 | 3/1942 | Bee et al. . |
| 2,548,131 | 4/1951 | Stern . |
| 2,609,086 | 9/1952 | McBride et al. . |
| 2,777,566 | 1/1957 | King . |
| 2,789,686 | 4/1957 | Bonnafe . |
| 2,848,102 | 8/1958 | Whitney . |
| 3,043,237 | 7/1962 | McKee et al. . |
| 3,082,861 | 3/1963 | Kornylak . |
| 3,141,544 | 7/1964 | Hansen . |
| 3,216,555 | 11/1965 | Schelde . |
| 3,319,765 | 5/1967 | Hasenwinkle et al. . |
| 3,338,382 | 8/1967 | Fogg . |
| 3,467,231 | 9/1969 | Haznar . |
| 3,545,933 | 12/1970 | Podschadly et al. . |
| 3,737,024 | 6/1973 | Gelzer . |
| 3,848,726 | 11/1974 | Wiemer . |
| 3,858,707 | 1/1975 | Block et al. . |
| 3,888,344 | 6/1975 | Major . |
| 3,934,701 | 1/1976 | Mooney et al. . |
| 3,949,859 | 4/1976 | Nussbaumer et al. . |
| 3,991,685 | 11/1976 | Toby ............................... 198/795 X |
| 4,062,444 | 12/1977 | Nakov et al. ...................... 198/648 |
| 4,088,220 | 5/1978 | Jacksch et al. .................... 198/472 |
| 4,201,286 | 5/1980 | Meier ................................ 198/461 |
| 4,240,542 | 12/1980 | Wiknich ............................ 198/751 |
| 4,441,606 | 4/1984 | Miller et al. ...................... 198/751 |
| 4,442,935 | 4/1984 | Gregg .............................. 198/795 X |
| 4,461,216 | 7/1984 | Carney ............................ 198/472 X |
| 4,479,572 | 10/1984 | Merz ................................. 198/345 |
| 4,505,381 | 3/1985 | Major ............................... 198/781 |
| 4,556,143 | 12/1985 | Johnson ............................ 198/841 |
| 4,598,818 | 7/1986 | Miller .............................. 198/803.2 |
| 4,667,804 | 5/1987 | Dubuit et al. ................. 198/465.1 X |
| 4,681,212 | 7/1987 | Miller .............................. 198/803.2 |
| 4,699,266 | 10/1987 | Weiss .............................. 198/803.2 |
| 4,712,670 | 12/1987 | Burkhardt ..................... 198/803.01 |
| 4,751,998 | 6/1988 | Yano .............................. 198/465.1 |
| 4,776,453 | 10/1988 | Miller .............................. 198/803.2 |
| 4,793,261 | 12/1988 | Schwaemmle ............ 198/803.01 X |
| 4,896,763 | 1/1990 | Hordyk et al. ................... 198/803.2 |
| 4,934,515 | 6/1990 | Linden ............................ 198/803.2 |
| 5,029,691 | 7/1991 | Fein et al. .................... 198/465.3 X |

FOREIGN PATENT DOCUMENTS

| | | |
|---|---|---|
| 55-48125 | 4/1980 | Japan . |
| 956241 | 9/1982 | U.S.S.R. . |
| 937110 | 9/1963 | United Kingdom . |
| 1411940 | 10/1972 | United Kingdom . |

Primary Examiner—David H. Bollinger
Assistant Examiner—Tuan N. Nguyen
Attorney, Agent, or Firm—Harness, Dickey & Pierce

[57] ABSTRACT

A conveyor assembly having a pallet including a deformable drive pin. The drive pin is comprised of urethane and is operable to deform as the pallet engages the teeth of a pallet driving sprocket employed to drive the pallet around curved end portions of the conveyor. The deformability of the drive pin enables smoother engagement of the pallet with the pallet driving sprocket teeth when the drive pin does not fall perfectly inbetween adjacent teeth of the pallet driving sprocket. The deformable drive pin is also disposed within oversized openings allowing the drive pin to be urged outwardly by a tooth of the pallet driving sprocket as the deformable drive pin comes into contact with the tooth. The pallet further includes a drive block for holding the deformable drive pin, the drive block having leg portions operable to circumscribe at least a portion of the pallet driving sprocket. The overall length of the drive block is such that the deformable drive pin is disposed at approximately the midpoint of the total length of the drive block. The leg portions further serve to stabilize the pallet as it traverses the curved end portions of the conveyor.

21 Claims, 5 Drawing Sheets

CONVEYOR SYSTEM

BACKGROUND OF THE INVENTION

1. Technical Field

This invention relates generally to conveyor systems, and more particularly to an endless conveyor system having at least one pallet, wherein the pallet includes a deformable drive pin.

2. Discussion

Conveyor systems are used in a wide variety of applications to move various articles between desired points. One specific conveyor system is of the endless variety and includes at least one endless roller chain entrained about roller chain driving sprockets at longitudinally disposed opposite ends of the conveyor.

With such conveyor systems as described above, a heretofore troubling point has been the controlled movement of the pallet around the curved end portions between the top and bottom runs of the endless roller chain assembly(s) More specifically, heretofore developed conveyor systems have included pallets which do not smoothly and positively engage the means by which they are driven around the curved end portions of the endless roller chain assemblies. This problem can be particularly acute when the pallet is frictionally engaged with the roller chain assemblies that are frictionally driving it. In such instances, the pallet is often not in perfect alignment with the gears and/or sprockets which drive it around the curved end portions. When misalignment occurs, the pallet may jam as it comes into engagement with the gear, sprocket, etc., which drives it around the curved end portions, or at the very least, the pallet may be jolted suddenly or suffer unacceptable vibration. Vibration and/or jolting of the pallet can contribute to unacceptable wear of the various components of the conveyor system and add significantly to the noise associated with operation of the system.

Another drawback of heretofore developed pallets is the complexity of the mechanisms needed to couple the pallet with a pallet driving sprocket to drive the pallet between the upper and lower runs of the conveyor. Many such prior art systems incorporate springs and/or like biasing means, latches, etc., to insure positive engagement with the pallet driving sprocket. Such mechanisms add to the cost of the overall conveyor system and detract from the reliability of the system, in addition to often adding additional maintenance to keep the mechanisms in proper working order.

Accordingly, it is a principal object of the present invention to provide a conveyor system incorporating a frictionally driven pallet, where the pallet includes a mechanism for smoothly, quietly and more positively engaging a sprocket wheel used to drive the sprocket around curved end portions of the conveyor between the upper and lower runs thereof.

More specifically, it is an object of the present invention to provide a frictionally driven pallet for a conveyor system, where the pallet includes a drive block having a drive pin operable to deform in response to abutting engagement with a tooth of a pallet driving sprocket, to thereby facilitate smoother engagement of the pallet and teeth of the pallet driving sprocket, when the pallet is positioned such that the drive pin does not make perfect engagement inbetween adjacent teeth of the pallet driving sprocket.

It is still a further object of the present invention to provide a frictionally driven pallet for a conveyor system which incorporates a deformable drive pin disposed within oversized openings, the oversized openings enabling the deformable drive pin to be urged outwardly slightly as the pallet is driven into engagement with the pallet driving sprocket to thereby further facilitate smooth engagement between the pallet and pallet driving sprocket.

It is still a further object of the present invention to provide a frictionally driven pallet for a conveyor system which incorporates a pallet, a drive block having leg portions operable to circumscribe at least a portion of a pallet driving sprocket used to drive the pallet around curved end portions of the conveyor, where the drive block has a total length such that a deformable drive pin disposed therethrough is located at approximately the midpoint of the total length of the drive block, the overall length of the drive block contributing to further stabilizing the pallet as the pallet is driven around the curved end portions of the conveyor.

It is still another object of the present invention to provide a frictionally driven pallet for a conveyor system which incorporates a driving mechanism which is of a simple construction exclusive of springs and latching assemblies, and which is relatively inexpensive to manufacture and more reliable than heretofore mechanisms.

SUMMARY OF THE INVENTION

The above and other objects are accomplished by a conveyor system in accordance with the preferred embodiments of the present invention. The conveyor system generally comprises upper and lower pairs of laterally spaced apart guide rails, a pair of endless roller chain assemblies entrained about the guide rails, a pallet driving sprocket operable to drive a pallet around curved end portions between upper and lower runs of the conveyor, and a pallet operable to frictionally engage portions of the roller chain assemblies and also to positively engage the pallet driving sprocket.

The pallet includes deformable drive pin means for enabling a portion of the pallet to be releasably coupled to the pallet driving sprocket as the sprocket is driven around the curved end portions of the conveyor. The deformable drive pin means is operable to deform if the pallet is positioned such that the deformable drive pin means does not fall into perfect engagement inbetween adjacent teeth of the pallet driving sprocket. In such instances, the deformable drive pin means deforms to enable smoother, more positive engagement inbetween adjacent teeth of the pallet driving sprocket.

In a preferred embodiment of the present invention the deformable drive pin means is incorporated within a drive block extending transversely of an article carrying surface of the pallet. The drive block includes leg portions which provide the drive block with an overall length such that the deformable drive pin means is disposed at approximately the midpoint of the total length of the drive block. The leg portions further help to stabilize the pallet as the pallet engages the pallet driving sprocket and is driven around the curved end portions of the conveyor system.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
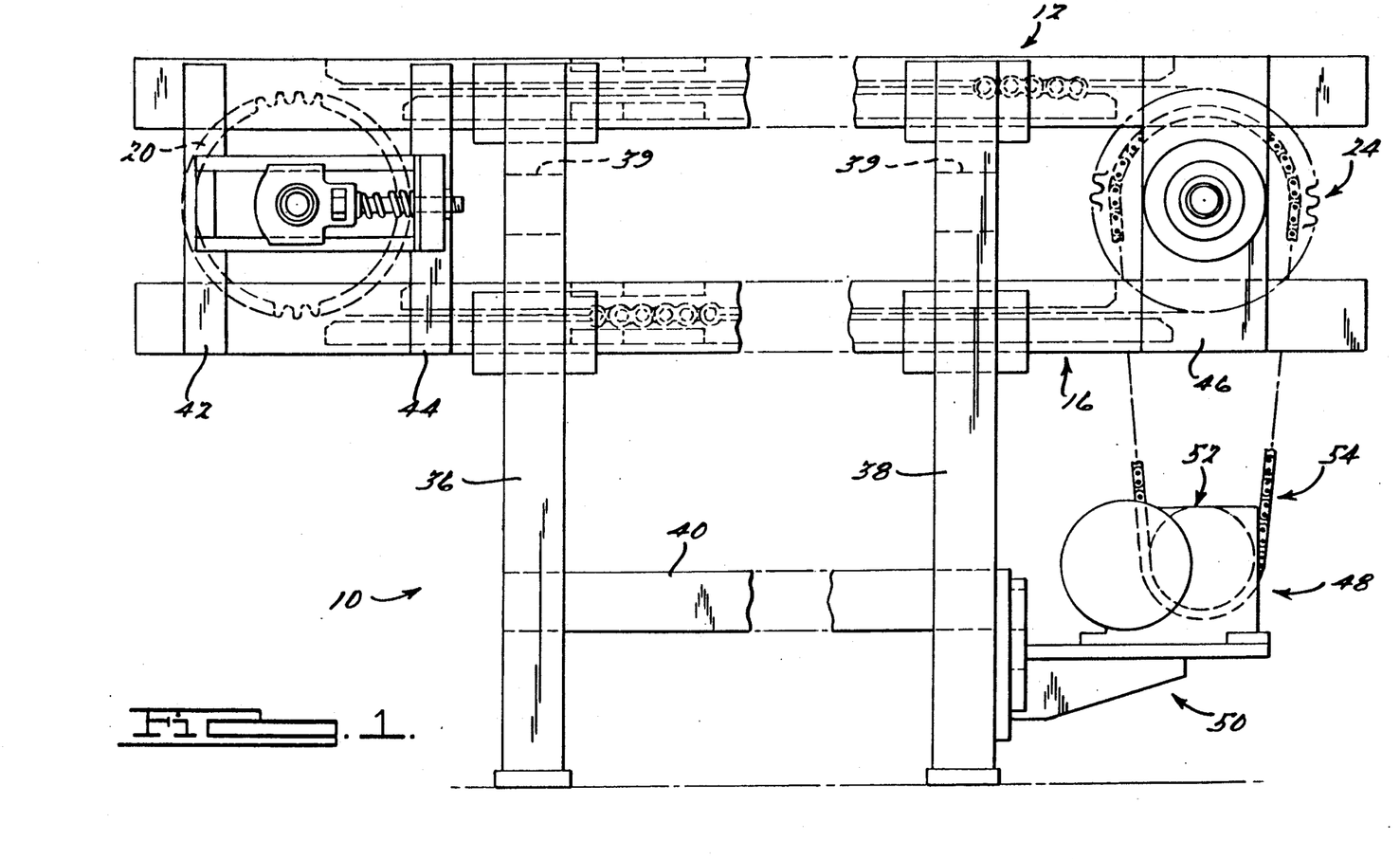
FIG. 1 is a side view of a conveyor system in accordance with the present invention.
Figure 2:
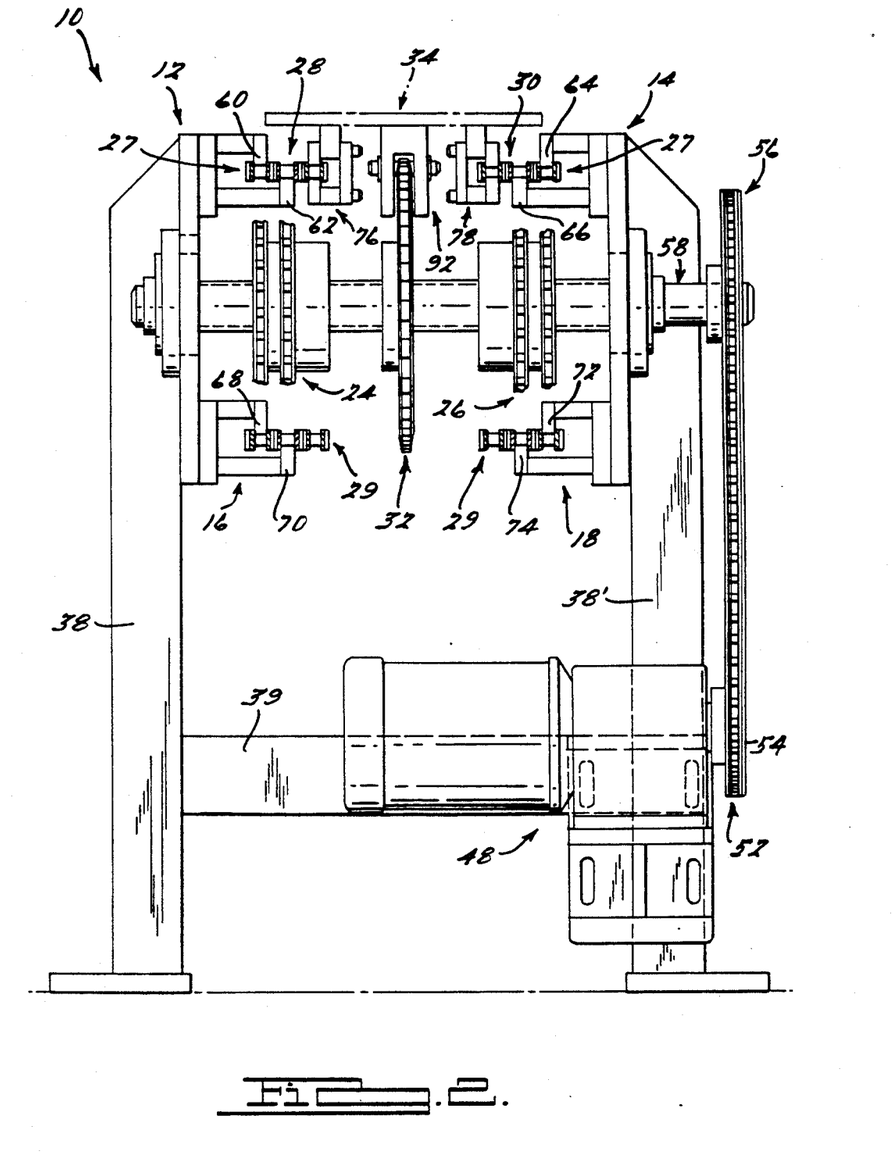
FIG. 2 is an end view of the conveyor system illustrated in FIG. 1.
Figure 3:
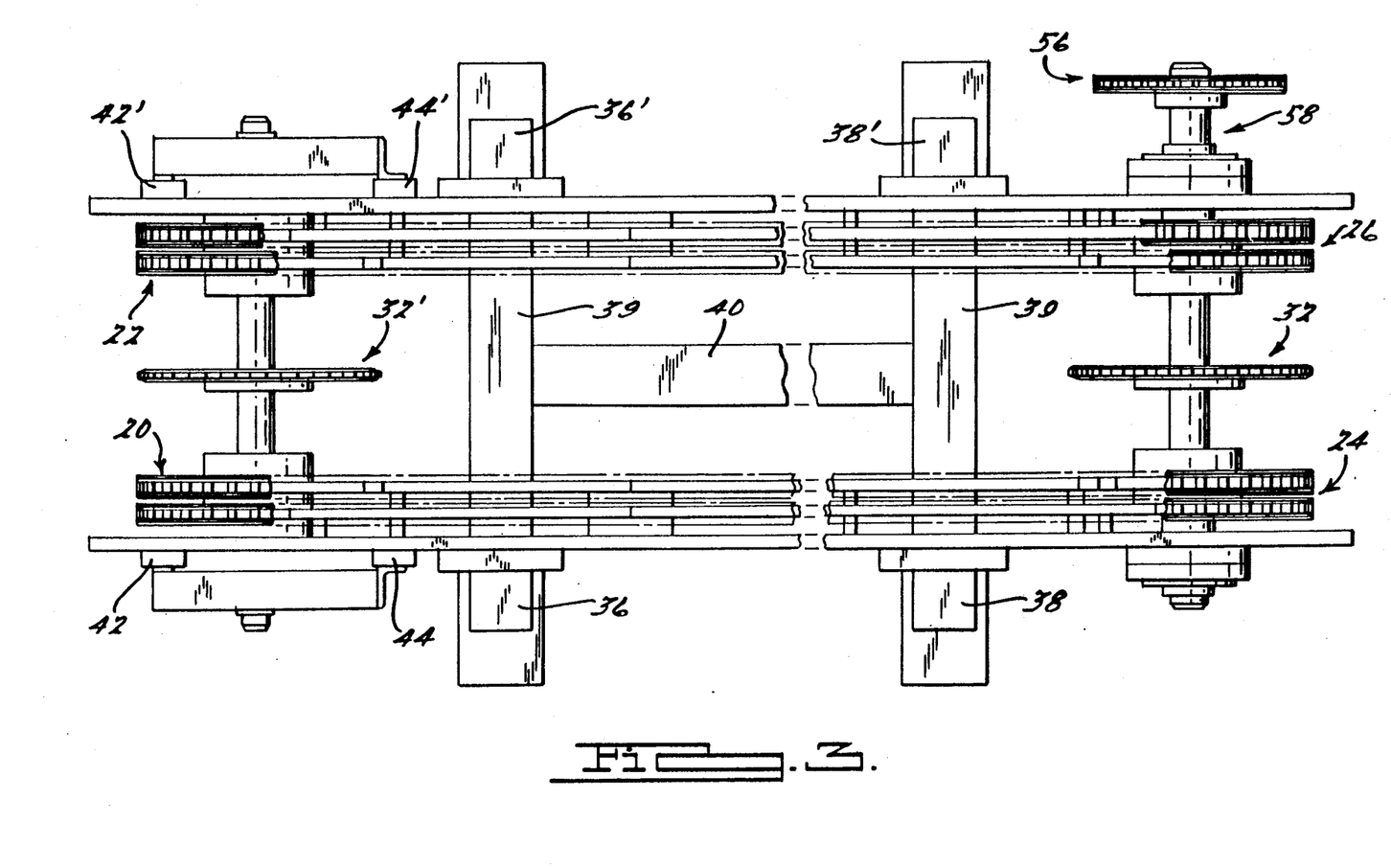
FIG. 3 is a plan view of the conveyor system of FIG. 1.

Referring to FIGS. 1-3, there is shown a conveyor system 10 in accordance with a preferred embodiment of the present invention. The system 10 generally comprises a pair of longitudinally disposed, laterally spaced apart upper guide rails 12 and 14 and a similar pair of longitudinally disposed, laterally spaced apart lower guide rails 16 and 18; a first plurality of roller chain driving sprocket pairs 20 and 22; a second plurality of roller chain driving sprocket pairs 24 and 26 disposed in longitudinal and spaced apart relationship with sprocket pairs 20 and 22; a pair of triple-strand, endless roller chain assemblies 28 and 30, with roller chain 28 being entrained about upper and lower guide rails 12 and 16 and roller chain driving sprocket pairs 20 and 24, and roller chain 30 being entrained about roller chain driving sprocket pairs 22 and 26; a pair of pallet driving sprockets 32,32, centrally disposed between guide rail pairs 12, 16 and 14, 18; and a pallet 34. The vertically uppermost longitudinal portions of roller chain assemblies 28 and 30 form an upper conveyor run 27, while the lowermost, longitudinal portions of chains 28 and 30 form a lower conveyor run 29.

The system 10 further includes frame members 36, 36', 38, 38', 39, 40, 42, 42', 44, 44' and 46, 46' for supporting and maintaining the guide rails, 12-18 in their longitudinally, spaced apart orientation. Frame members 36-46 may be secured to each other and/or to guide rails 12-18 by welding, brazing, nut and bolt assemblies, etc., or virtually any other conventionally known means of attachment.

Further included in the system is a drive motor 48 which is supported on a motor support member 50. Motor support member 50 is in turn coupled to frame member 38'. The drive motor 48 includes a conventional driving means such as a gear or sprocket 52 upon which is entrained a driving chain 54. Driving chain 54 is further entrained upon a drive shaft sprocket 56 which is operatively associated with a main drive shaft 58. Drive motor 48 is therefore operable to impart a motive, rotational force to drive shaft 58 to rotate sprocket pairs 24 and 26 and pallet driving sprocket 32, which are fixedly secured to drive shaft 58. Rotation of sprockets 24 and 26 operates to rotate roller chain assemblies 28 and 30 about guide rail pairs 12,16 and 14,18 respectively.

Figure 4:
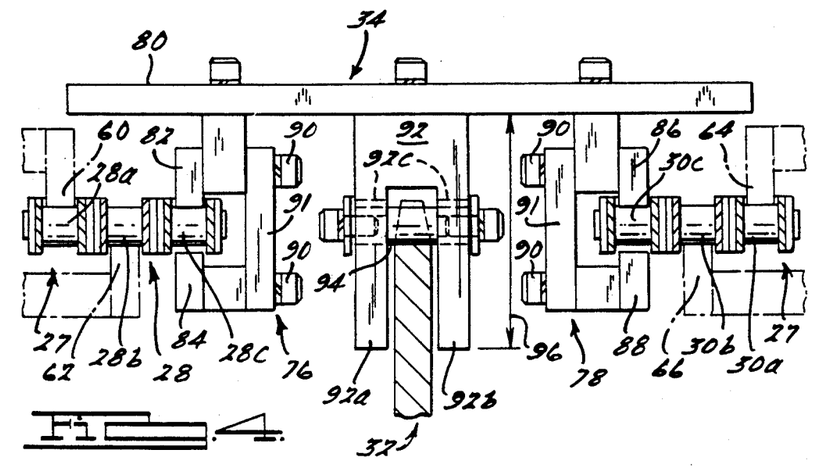
FIG. 4 is an end view of the pallet of the present invention showing the pallet frictionally supported on a triple-strand roller chain, wherein the roller chain is supported by upper and lower support portions of the upper guide rails.

With specific reference to FIGS. 2 and 4, it can best be seen how the roller chain assemblies 28 and 30 are supported by their respective guide rails 12,16 and 14,18. Guide rail 12 includes upper and lower support arms 60 and 62 which support roller chain assembly 28 along roller portions 28a and 28b (FIG. 4) respectively thereof. Similarly, guide rail 14 includes upper and lower support arms 64 and 66 respectively which support roller chain assembly 30 along roller portions 30a and 30b respectively. Lower guide rails 16 and 18 support the lower run 29 of roller chain assemblies 28 and 30 via upper and lower support arms 68 and 70 and 72 and 74.

With specific reference to FIG. 4, it can be seen most clearly how the pallet 34 frictionally rides upon portions of roller chain assemblies 28 and 30. Pallet 34 includes a pair of frictional drive means 76 and 78 depending transversely downwardly of an article supporting surface 80. The frictional drive means 76 and 78 may be secured to the article supporting surface 80 by threaded screws, welding, brazing or any like conventional method of attachment.

Frictional drive means 76 includes an upper supporting arm 82 and a lower supporting arm 84. Frictional drive means 78 similarly includes an upper supporting arm 86 and a lower supporting arm 88. The supporting arms 82-88 are each secured via threaded screws 90 and members 91, although it should be appreciated that any suitable method of securing support arms 82-88 could be employed if desired.

Each of the support arm pairs 82, 84 and 86,88 define gaps therebetween into which innermost roller portions 28c and 30c extend. When the pallet 34 is positioned on the upper run 27 of roller chain assemblies 28 and 30, support arms 82 and 86 support the pallet frictionally upon rollers 28c and 30c. As roller chain assemblies 28 and 30 are driven along their respective paths the weight of pallet 34, exclusive of any article being supported thereon, is sufficient to cause the support arms 82 and 86 to frictionally engage rollers 28c, thereby enabling roller chain assemblies 28 and 30 to move pallet 34 along the upper run 27. As should now be clear, when the pallet 34 is disposed on the lower run 29 of roller chain assemblies 28 and 30, the pallet 34 will be positioned upside down from the illustration shown in FIG. 4 and support arms 84 and 88 will be supporting pallet 34 on the upper surfaces of rollers 28c and 30c. Accordingly, the pallet 34 in effect "hangs" down in an upside down manner to frictionally engage rollers 28c and 30c. The weight of pallet 34 alone is sufficient to effect frictional engagement of support arms 84 and 88 with rollers 28c and 30c to enable the pallet 34 to be driven longitudinally along the lower run of roller chain assemblies 28 and 30.

Figure 5:
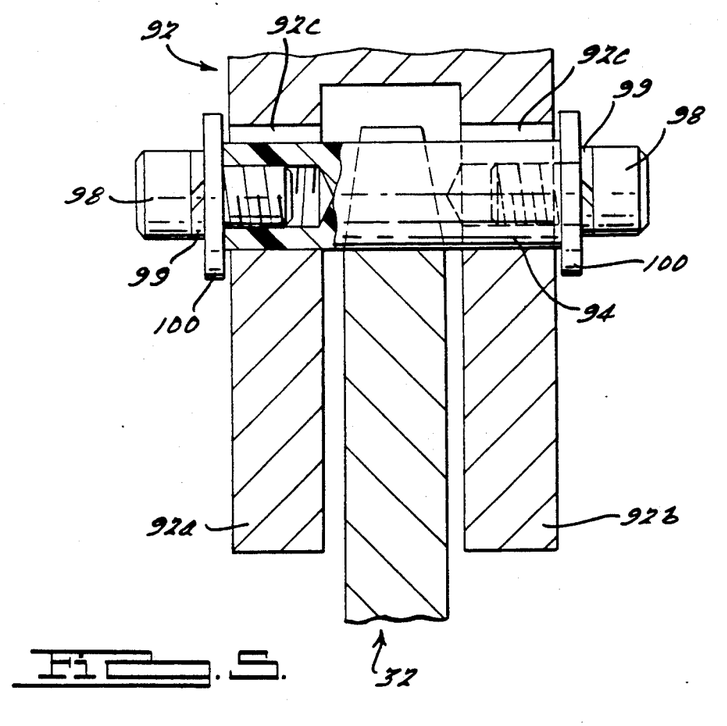
FIG. 5 is an enlarged, fragmentary, cross-sectional view of a portion of the drive block shown in FIG. 4 illustrating more clearly the deformable, cylindrical drive pin of the present invention.

With reference now to FIGS. 4 and 5, it can be seen that pallet 34 also includes a driving block 92 depending transversely downwardly of article supporting surface 80. Drive block 92 may be secured to surface 80 by threaded screws, welding, brazing or any other conventional like manner.

Drive block 92 is comprised of leg portions 92a and 92b which form a "U-shaped" configuration which circumscribes a portion of pallet driving sprocket 32 as the pallet 34 traverses the curved end portions of the roller chain assemblies 28 and 30. The drive block 92 further includes a pair of coaxially aligned openings 92c (shown in phantom) within which is disposed a deformable drive pin 94 (shown partially in phantom). The overall length of drive block 92, as represented by arrow 96, is such that the deformable drive pin 94 is located at approximately the midpoint of length 96. By extending the length of legs 92a and 92b as is shown, rather than only to just below the lower surfaces of openings 92c, the leg portions 92a and 92b are able to "stabilize" the pallet 34 as the pallet 34 is driven around the curved end portions of the roller chain assemblies 28 and 30. While length 96 may be varied significantly, it has been found that particularly stable operation of pallet 34 has been achieved when length 96 is approximately 45% of the diameter of sprocket 32.

With specific reference to FIG. 5, the manner in which deformable drive pin 94 is disposed within openings 92c can be seen more clearly. Deformable drive pin 94 is secured within openings 92c via threaded screws 98, lock washers 99 and oversized washers 100. Washers 100 are of a sufficient diameter so as to sufficiently cover the diameter of openings 92c to thereby captively maintain drive pin 94 within leg portions 92a and 92b.

Deformable drive pin 94 is preferably cylindrical in shape, although it should be appreciated that other shapes could just as easily be employed if so required by the tooth configuration of sprocket 32. Deformable drive pin 94 is preferably comprised of urethane, and preferably urethane having a hardness of about 80 durometers. The diameter of deformable drive pin 94 is preferably at least about 10% less than the diameter of openings 92c, and more preferably about 30% less than the diameter of openings 42c, to enable deformable drive pin 94 to move inwardly and outwardly relative to pallet drive sprocket 32. It should be appreciated, however, that in some applications it may not be necessary to include "oversized" openings such as openings 92c. The advantages of oversized openings will be illustrated clearly momentarily.

With reference now to FIGS. 6-10, it is shown most clearly how deformable drive pin 94 and openings 92c cooperate to provide smooth engagement with pallet drive sprocket 32, even though the pallet 34 happens to be frictionally positioned on drive chains 28 and 30 (not shown) in such a manner as to produce misalignment or imprecise engagement of the drive pin inbetween adjacent teeth of pallet drive sprocket 32.

Figure 6:
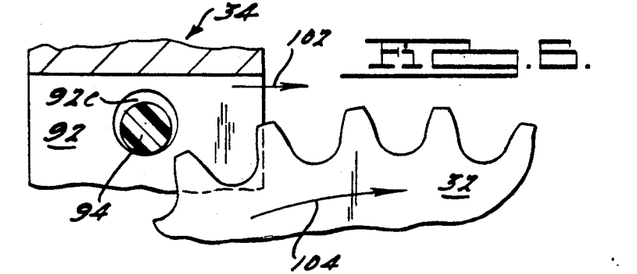
FIGS. 6-10 illustrate a fragmentary side view of a portion of the drive block of the pallet illustrated in FIG. 4, showing most clearly how the deformable, cylindrical drive pin thereof is operable to deflect and then deform in response to abutting engagement with a tooth of the pallet driving sprocket before becoming engaged inbetween adjacent teeth of the sprocket.

Referring initially to FIG. 6, it can be seen that deformable drive pin 94 rests along the bottommost surface of opening 92c as the pallet 34 travels in the direction of arrow 102 and the pallet drive sprocket 32 travels in the direction of arrow 104.

Figures 7, 8:
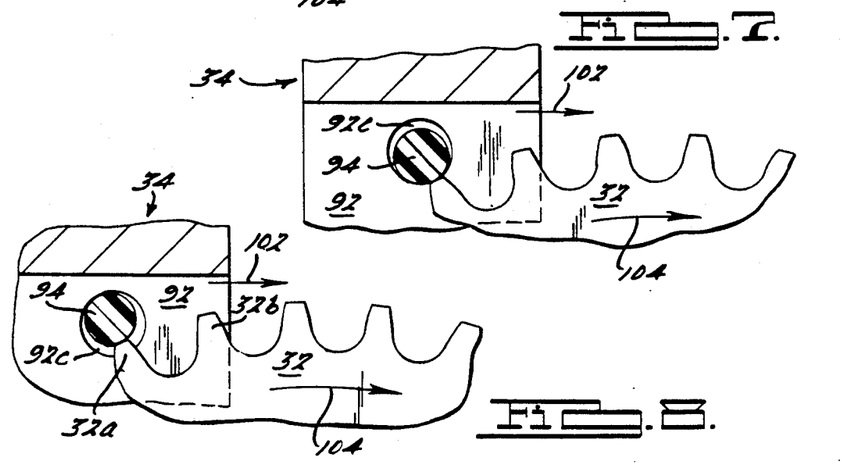

When the pallet 34 happens to be imprecisely positioned on roller chains 28 and 30 such that precise engagement inbetween adjacent teeth of sprocket 32 does not occur, deformable pin 94 will enter into abutting contact with a tooth 32a of sprocket 32 as the pallet 34 is driven into engagement with the sprocket 32, as shown in FIG. 7. With the oversized openings 92c of the present invention, the deformable drive pin 94 is able to be deflected partially out of the path of tooth 32a, as shown in FIG. 8, as the pallet 34 and sprocket 32 continue to move in the directions indicated by arrows 102 and 104. In some instances, the increased diameters of openings 92c alone may enable smooth engagement of deformable driving pin 94 to occur inbetween teeth 32a and 32b of sprocket 32.

Figures 9, 10:
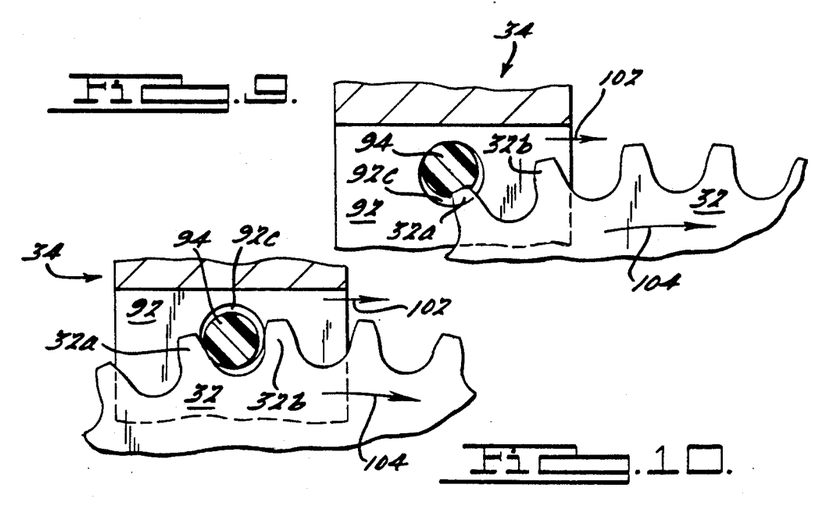

When the positioning of pallet 34 is so imprecise that even the deflection of deformable drive pin 94 alone will not facilitate smooth engagement with sprocket 32, the deformability of deformable drive pin 94 enables the drive pin 94 to be partially compressed by tooth 32a of sprocket 32, as shown in FIG. 9. This further helps enable smooth engagement of the deformable drive pin 94 inbetween adjacent teeth 32a and 32b as the pallet 34 and sprocket 32 continue to move in the directions of arrows 102 and 104. As can also be seen from FIG. 10, after abutting engagement with tooth 32a, the deformable drive pin 94 is allowed to drop back down into contact with the lower surface of opening 92 and inbetween teeth 32a and 32b.

Accordingly, it is a principal advantage of the present invention that the drive pin 94 thereof is deformable to allow a smoother engagement thereof with a tooth of a pallet drive sprocket when a pallet is positioned on the roller chain assemblies such that the drive pin imprecisely engages the teeth of the pallet drive sprocket. Such imprecise engagement is not infrequent because the pallet is not fixedly secured to the roller chain assemblies 28 and 30, and thus held in a precise position, but rather is frictionally supported and therefore free to be momentarily stopped along its travel and otherwise moved about.

The deformability of deformable drive pin 94, the oversized openings 92c and the extended nature of leg portions of 92a and 92b of drive block 92 all contribute cooperatively to enable a more controlled and positive engagement of pallet 34 as the pallet traverses the curved end portions of endless roller chain assemblies 28 and 30. The more controlled engagement of pallet 34 with sprocket 32 further reduces vibration of the pallet 34, the noise associated with engagement of deformable driving pin 94 and sprocket 32, and makes for a smoother overall operation of conveyor system 10.

Those skilled in the art can now appreciate from the foregoing description that the broad teachings of the present invention can be implemented in a variety of forms. Therefore, while this invention has been described in connection with particular examples thereof, the true scoop of the invention should not be so limited since other modifications will become apparent to the skilled practitioner upon a study of the drawings, specification and following claims.

What is claimed is:

1. A conveyor system comprising:
    endless roller chain means for frictionally supporting and conveying a pallet, said endless roller chain means forming at least one curved end portion;
    a pallet driving sprocket having a plurality of teeth, said pallet driving sprocket being operable to drive said pallet around said curved end portion of said roller chain means; and
    a pallet operable to frictionally engage a portion of said roller chain means;
    said pallet including a deformable drive pin for engaging in between adjacent teeth of said pallet driving sprocket as each said tooth engages and moves past said deformable drive pin, said deformable drive pin deforming in shape in response to abutting contact with each said tooth of said pallet driving sprocket to thereby facilitate positive engagement between said adjacent teeth of said pallet driving sprocket.

2. A conveyor system comprising:
    endless roller chain means for frictionally supporting and conveying a pallet;

drive means operatively associated with said roller chain means for driving said roller chain means;

a pallet driving sprocket having a plurality of teeth, said sprocket being responsive to said drive means;

a pallet operable to frictionally engage a portion of said roller chain means for moving articles along a path at least partially defined by said roller chain means; and said pallet including a deformable drive pin for positively engaging in between adjacent teeth of said pallet driving sprocket, said deformable drive pin operating to deform in response to abutting contact with each said tooth of said pallet driving sprocket to thereby facilitate positive engagement in between said adjacent teeth of said pallet driving sprocket.

3. The conveyor system of claim 2, wherein said deformable drive pin comprises a urethane drive pin.

4. The conveyor system of claim 3, wherein said urethane drive pin comprises an 80 durometer urethane drive pin.

5. The conveyor system of claim 2, wherein said deformable drive pin comprises a first diameter; and wherein said pallet includes a drive block depending transversely therefrom, said drive block having a pair of coaxially aligned openings for receiving therethrough said deformable drive pin, said coaxially aligned openings having a second diameter, said second diameter being at least about 10% greater than said first diameter.

6. The conveyor system of claim 2, wherein said pallet includes a drive block depending transversely therefrom, said drive block having a pair of leg portions operable to at least partially circumscribe said pallet driving sprocket, said drive block further having a pair of coaxially aligned openings for receiving therethrough said deformable drive pin, said drive block having an overall length such that said deformable drive pin is disposed at approximately a midpoint of said overall length.

7. A conveyor system comprising:
guide rail means for supporting at least one roller chain assembly;
drive shaft means spaced apart from said guide rail means and extending transversely of said guide rail means for driving a sprocket;
a sprocket operatively associated with said drive shaft means;
endless roller chain means for frictionally transporting a pallet, said roller chain means being entrained about said guide rail means and said sprocket, said sprocket being operable to drive said roller chain means in response to rotational movement of said drive shaft means;
pallet driving sprocket means responsive to said drive shaft means for positively driving a pallet around a curved end portion of said roller chain means;
a pallet operable to frictionally engage a portion of said roller chain means as said roller chain means is driven in response to rotational movement of said sprocket, said pallet including an article supporting surface and a drive block depending transversely of said article supporting surface, said drive block including a pair of spaced-apart leg portions operable to partially circumscribe a portion of said second sprocket means when said pallet traverses said curved end portion of said roller chain means, said leg portions further including a pair of coaxially aligned openings in relative vertical alignment with said teeth of pallet driving sprocket means;
said drive block further including a deformable drive pin extending through said coaxial openings within said leg portions for engaging said teeth of said pallet driving sprocket means to thereby positively propel said pallet around said curved end portion of said roller chain means, said deformable drive pin further being operable to deform in response to abutting engagement with an end portion of a tooth of said pallet driving sprocket to facilitate positive engagement in between adjacent teeth of said pallet as said pallet traverses said curved end portion of said roller chain means.

8. The conveyor system of claim 7, wherein said deformable drive pin comprises a first diameter; and wherein said coaxially aligned openings in said leg portions comprise a second diameter, said second diameter being at least about 10% greater than said first diameter.

9. The conveyor system of claim 7, wherein said deformable drive pin comprises a deformable urethane driving pin.

10. The conveyor system of claim 9, wherein said urethane driving pin comprises an 80 durometer urethane driving pin.

11. The conveyor system of claim 7, wherein said leg portions of said drive block means are of such a length that placement of said deformable drive pin is at approximately a midpoint of a total length of said drive block.

12. The conveyor system of claim 7, wherein said endless roller chain means comprises a triple-strand endless roller chain.

13. The conveyor system of claim 7, further comprising motor means operatively associated with said drive shaft means for rotationally driving said drive shaft means.

14. For a conveyor system having an endless roller chain assembly and a pallet driving sprocket disposed on a drive shaft, wherein said sprocket is operable to positively drive a pallet or like article carrying device around a curved end portion between upper and lower runs of said endless roller chain assembly, a pallet comprising:
an article supporting surface for carrying an article thereon, said article supporting surface including frictional drive means for frictionally engaging a portion of said endless roller chain assembly; and
drive block means depending transversely of said article supporting surface toward said sprocket, said drive block means including a pair of leg portion operable to at least partially circumscribe a portion of said sprocket;
a pair of leg portions depending traversely of said article carrying surface, each said leg portion including a pair of coaxially aligned openings and a deformable drive pin disposed therethrough, said deformable drive pin being operable to deform in response to abutting engagement with a tooth of said pallet driving sprocket to thereby facilitate smooth engagement in between adjacent teeth of said sprocket as said pallet traverses said curved end portion between said upper and lower runs of said endless roller chain assembly.

15. The pallet of claim 14, further comprising drive block means interposed between said article supporting surface and said leg portions, said drive block means and said leg portions having a combined total length such that said deformable drive pin is disposed at approximately a midpoint of said combined total length.

16. A conveyor system comprising:
an upper pair of longitudinally disposed, laterally spaced apart guide rails;
a lower pair of longitudinally disposed, laterally spaced apart guide rails;
a first pair of roller chain driving sprockets, each one of said first pair of roller chain driving sprockets being disposed in laterally spaced apart alignment with one of said upper guide rails and one of said lower guide rails;
a pair of endless roller chains, said endless roller chains being entrained about an associated upper and lower guide rail and one each of said first and second pairs of roller chain drive sprockets;
a pair of pallet driving sprockets disposed at longitudinally opposite ends of said conveyor system, said pallet driving sprockets being operable to facilitate positively driving a pallet around curved end portions of said endless roller chains between upper and lower runs of said endless roller chains; and
a pallet having frictional drive means for frictionally engaging portions of said endless roller chains;
said pallet further including a drive block depending transversely therefrom, said drive block having a pair of legs for circumscribing a portion of said pallet driving sprockets as said pallet traverses said curved end portions of said endless roller chains, said leg portions further including a pair of coaxially aligned openings and a deformable, cylindrical drive pin disposed therethrough, said drive pin being operable to deform in response to abutting engagement with teeth of said pallet driving sprockets as said pallet approaches said curved end portions of said endless roller chain assembly, whereby deforming of said deformable, cylindrical drive pin facilitates positive engagement of said drive pin inbetween adjacent teeth of said pallet driving sprockets.

17. The conveyor system of claim 16, wherein said deformable, cylindrical drive pin comprises a first diameter and said coaxially aligned openings in said leg portions each are of a second diameter, said second diameter being at least about 10% larger than said first diameter.

18. The conveyor system of claim 16, wherein said drive block has a total length such that said deformable, cylindrical drive pin is disposed at approximately a midpoint of said total length.

19. The conveyor system of claim 16, further comprising a drive motor; and
a drive chain operatively associated with said drive motor and at least one of said pairs of roller chain driving sprockets, said drive motor being operable to drive said pair of roller chain driving sprockets to thereby cause said pair of endless roller chains to be driven about said first and second pairs of roller chain driving sprockets.

20. The conveyor system of claim 16, wherein said deformable, cylindrical drive pin comprises a deformable, cylindrical, urethane drive pin.

21. The conveyor system of claim 20, wherein said deformable, cylindrical, urethane drive pin comprises an 80 durometer urethane drive pin.

* * * * *